United States Patent [19]

Someya

[11] Patent Number: 4,849,793
[45] Date of Patent: Jul. 18, 1989

[54] IMAGE READING APPARATUS
[75] Inventor: Akihiko Someya, Yokohama, Japan
[73] Assignee: Kabushiki Kaisha Toshiba, Kanagawa, Japan
[21] Appl. No.: 50,034
[22] Filed: May 15, 1987
[30] Foreign Application Priority Data
May 19, 1986 [JP] Japan .................. 61-115517
[51] Int. Cl.$^4$ .................. G03B 27/62; H05K 9/00
[52] U.S. Cl. ...................... 355/75; 361/424; 174/35 GC; 174/35 MS
[58] Field of Search .......... 355/75, 115, 14 C, 14 SH; 361/424; 174/35 GC, 35 MS

[56] References Cited

U.S. PATENT DOCUMENTS

| | | | |
|---|---|---|---|
| 3,997,265 | 12/1976 | Menon et al. | 355/75 |
| 4,053,223 | 10/1977 | Nebiker et al. | 355/75 |
| 4,412,255 | 10/1983 | Kuhlman et al. | 174/35 MS |
| 4,474,457 | 10/1984 | Phelps | 355/75 |
| 4,514,585 | 4/1985 | Paynton | 174/35 GC |
| 4,738,875 | 4/1988 | Hammond et al. | 174/35 MS |

FOREIGN PATENT DOCUMENTS

| | | | |
|---|---|---|---|
| 0200513 | 11/1986 | European Pat. Off. | 361/424 |
| 59-30549 | 2/1984 | Japan | 361/214 |

Primary Examiner—L. T. Hix
Assistant Examiner—D. Rutledge
Attorney, Agent, or Firm—Finengan, Henderson, Farabow, Garrett, & Dunner

[57] ABSTRACT

To shield electromagnetic waves generated from the inside of an image reading apparatus to the outside through the original mounting portion thereof, shielding means is attached to the platen cover thereof. The shielding means is any one of conductive materials such as metal sheet, paint, cloth, plastic, etc. To further effectively shield the field, the shielding means is grounded via connecting means to the apparatus body.

19 Claims, 5 Drawing Sheets

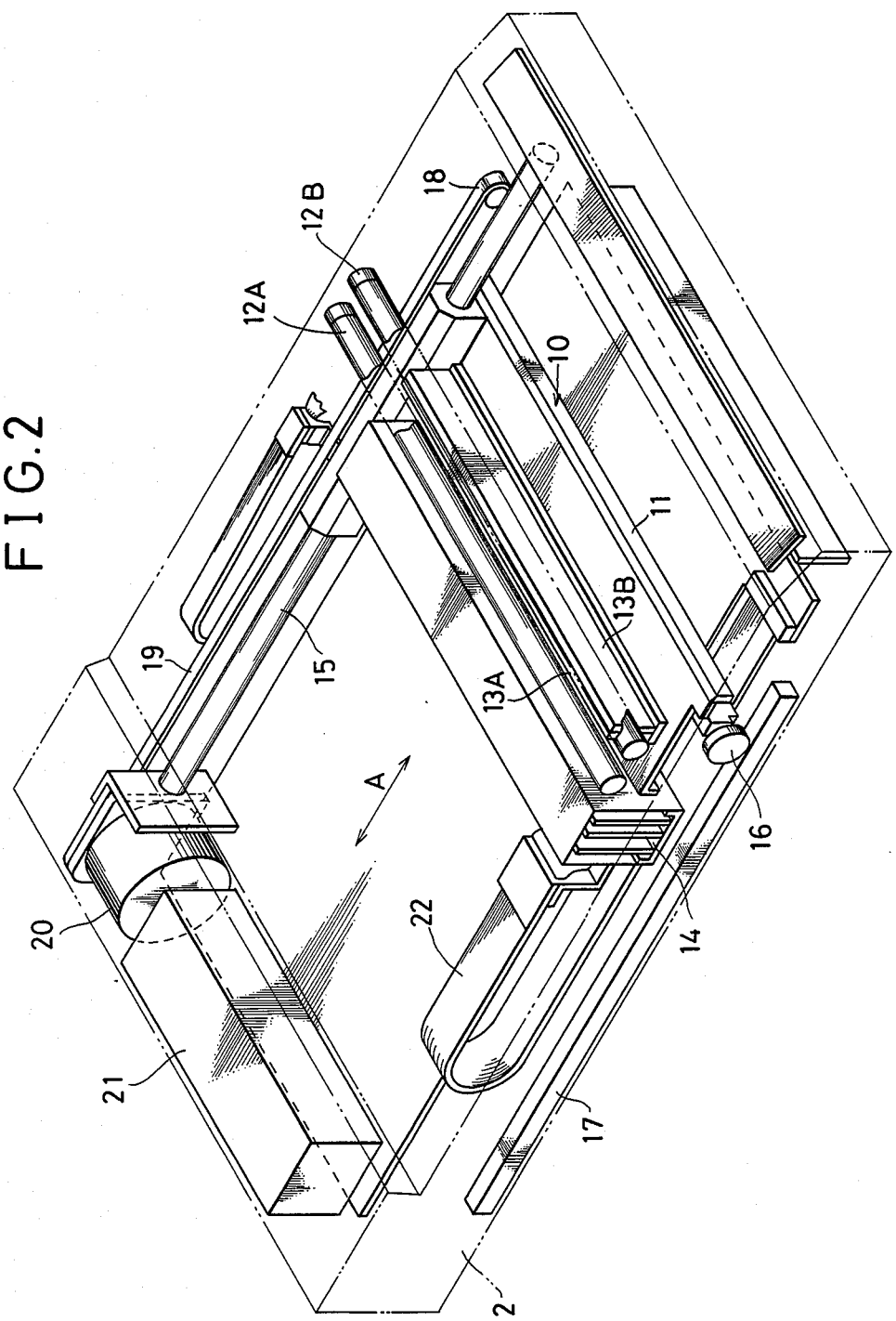

IMAGE READING APPARATUS

BACKGROUND OF THE INVENTION

1. Field of the Invention

The present invention relates generally to an image reading apparatus for reading information recorded on a paper placed at a predetermined position thereof in dependence upon light irradiation, for instance, and more specifically to a platen cover mounted on top of the image reading apparatus.

2. Description of the Prior Art

In image reading apparatus such as copying machines, an original on which image and letter or character information is recorded is placed at a predetermined position of the machine and irradiated with light to read light reflected from the original.

In these copying machines, since various electrical and electronical apparatus and devices are housed within the machine, noise with various frequency components is generated from the machine. To prevent electromagnetic fields generated from within the machine from leaking outside, shielding material such as steel sheets are partially provided inside the machine.

In the prior-art image reading apparatus, however, since a position at which an original is placed is not usually shielded, there exists a problem in that the apparatus leaks electromagnetic fields through the original mounting portion, so that other apparatus installed near the image reading apparatus undergo undesirable influences such that an image displayed on a display unit flickers or an error signal is generated when information is being written in a magnetic recording disc, for instance.

SUMMARY OF THE INVENTION

With these problems in mind, therefore, it is the primary object of the present invention to provide an image reading apparatus which can prevent internally-generated electromagnetic fields from being leaked outside.

To achieve the above-mentioned object, an image reading apparatus including an apparatus body with an original mounting portion and a platen cover pivotably mounted on top of the apparatus body so as to hold an original placed on the original mounting portion is characterized in that the platen cover is covered by electromagnetic field shielding means.

The shielding means is a conductive sheet attached to the platen cover made of a resin; the platen cover itself made of a conductive material; a conductive paint applied onto the platen cover; a cloth coated by a conductive paint, etc.

To further effectively shield the electromagnetic field, the shielding means is connected to the apparatus body via connecting means.

In the image reading apparatus according to the present invention, since the platen cover is shielded, it is possible to shield electromagnetic field generated from the apparatus and leaked through the original mounting base, thus preventing harmful influences thereof upon other apparatus installed near the image reading apparatus according to the present invention.

BRIEF DESCRIPTION OF THE DRAWINGS

The features and advantages of the image reading apparatus according to the present invention will be more clearly appreciated from the following description of the preferred embodiments of the invention taken in conjunction with the accompanying drawings in which:

FIG. 2 is an enlarged perspective view showing an inner arrangement of the image reading apparatus which generates electromagnetic waves;

DETAILED DESCRIPTION OF THE PREFERRED EMBODIMENTS

An exemplary image reading apparatus to which the electromagnetic field shielding member of the present invention is applied will be described with reference to the attached drawings.

Figure 1:
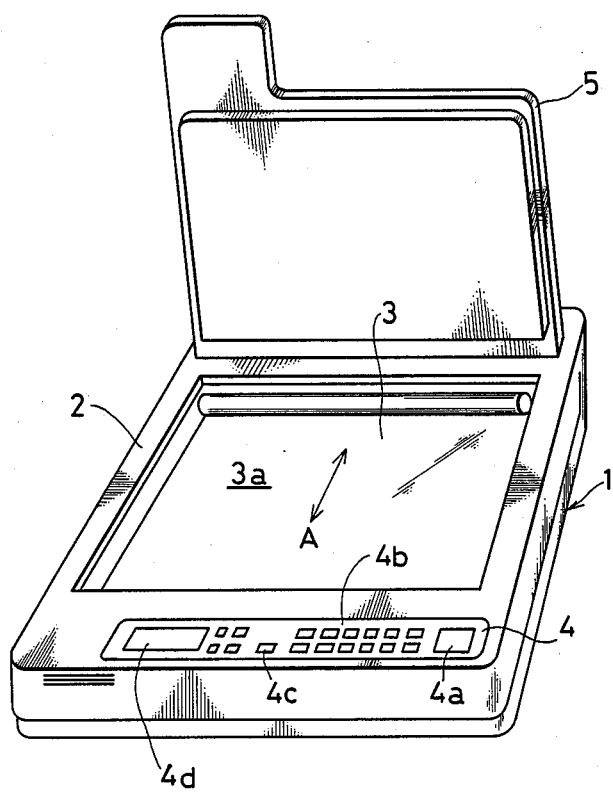
FIG. 1 is a perspective view showing an image reading apparatus to which the present invention is applied.

In FIG. 1, the apparatus 1 comprises an apparatus body 2 molded together with steel shield sheets; an original mounting base 3 on which an original is placed; a control panel 4 having a copying key 4a, ten keys 4b for determining the number of copied papers, a paper number display 4c for indicating the number of papers having been copied; and a machine status display 4d for indicating various machine conditions, and a platen cover 5 pivotably attached to the top rear side of the body 2 to press an original against the original mounting portion 3.

The original mounting base 3 is provided with a transparent glass plate 3a, under which there are arranged various elements and devices as shown in FIG. 2. In more detail, on a carriage 11 there are arranged two rod-shaped light sources (e.g. fluorescent lamps) 12A and 12B in parallel to each other, two light focusing and transmitting members (e.g. fiber lens) 13A and 13B for guiding light reflected from an original, a photoelectric transducer (e.g. CCD (charge coupled device) light image sensor) (not shown), and a signal processing unit 14 for processing output signals from the transducer, etc.

The carriage 11 is slidably moved to and fro along a guide rod 15 on one side and along guide rail 17 on the other side thereof by the aid of a wheel 16. A drive pulley (not shown) is disposed near one end of the guide rod 15 and a driver pulley 18 is disposed near the other end of the guide rod 15. A timing belt 19 is reeved around the drive and driven pulleys. The belt 19 is fixed to the carriage 11 via an appropriate member (not shown). Therefore, when a pulse motor 20 is activated to rotate the drive pulley, the carriage 11 is reciprocally moved to and fro in the arrow directions A in FIG. 2 along the lower surface of the original mounting glass 3a. The reference numeral 21 is a power source (e.g. inverter for supplying an AC power to the light sources 12A and 12B) and the numeral 22 denotes a harness for transmitting image information signals outputted from the signal processing unit 14 to the other apparatus (e.g. printer) via a connector (not shown). The above-mentioned elements constitute an image scanner. Further, the apparatus body 2 is usually grounded via a grounding cable bundled together with a power cable.

Since the fluorescent lamps 12A and 12B are moved being lit up in the arrow directions A in FIG. 1 during image reading operation, high frequency noise will be generated from the lamps 12A and 12B. In addition, electromagnetic waves are also generated from the signal processing unit 14 and the harness 22.

To shield various electromagnetic waves generated from the apparatus body 2 through the original mounting base 3 made of glass, in the present invention, electromagnetic field shielding means is provided for the platen cover 5 pivotably attached to the original mounting base 3.

Figure 3A:
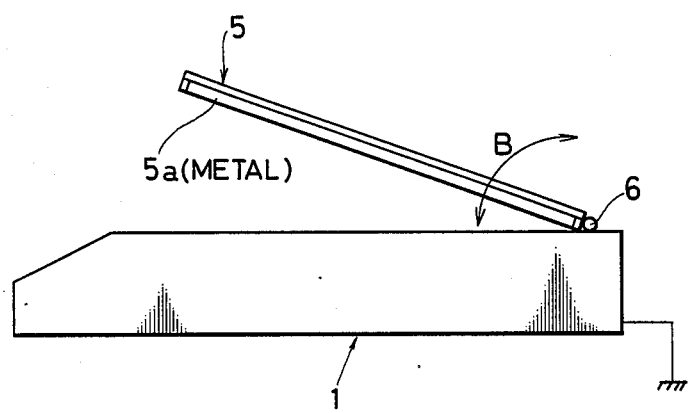
FIG. 3A is a side view showing the image reading apparatus shown in FIG. 1, in which a first embodiment (metal sheet) of the electromagnetic field shielding member according to the present invention is attached.

FIG. 3A shows a first embodiment of the present invention, in which an electromagnetic field shielding member 5a is attached on the lower surface of a plastic platen cover 5 for pressing an original placed on the original mounting base 3. The shielding member 5a is a conductive sheet made of metal such as iron, copper, brass, aluminum, etc.

Since the platen cover 5 is pivotal about a pivotal axis (hinge) 6 in the arrow directions B, the shielding member 5a can directly cover the original mounting base 3 when the copying machine is in operation. Further, the shielding member may be coated by paint for rust prevention.

Figure 3B:
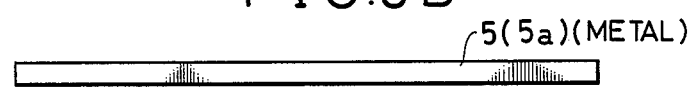
FIG. 3B is a side view showing a second embodiment of the present invention, in which a metallic platen cover is shown.

FIG. 3B shows a second embodiment of the shielding member of the present invention, in which the platen cover 5 itself is made of a conductive material or a metal plate to reduce the manufacturing cost. In this embodiment, it is of course preferable to apply a paint on both the surfaces of the metallic conductive platen cover 5. Further, the platen cover 5 can be made of conductive resin.

Figure 3C:
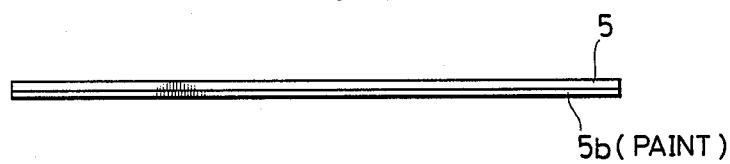
FIG. 3C is a side view showing a third embodiment of the present invention, in which a platen cover on which a conductive paint is applied is shown.

FIG. 3C shows a third embodiment of the shielding member of the present invention, in which a conductive paint 5b is applied to the lower surface of the plastic platen cover 5. In this embodiment, it is possible to reduce the weight of the platen cover provided with the shielding member.

Figure 3D:
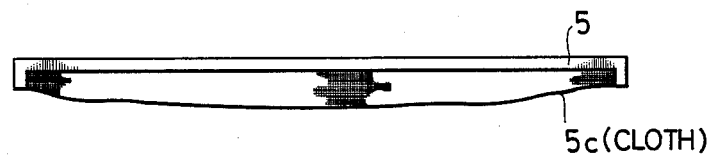
FIG. 3D is a side view showing a fourth embodiment of the present invention, in which a platen cloth on which a conductive paint is applied is shown.

FIG. 3D shows a fourth embodiment of the shielding member of the present invention, in which a cloth 5c on which a conductive paint is applied is attached to the plastic platen cover 5.

Further, not shown, it is also possible to adapt a conductive rubber, a conductive resin, etc. instead of the conductive paint, the conductive cloth, or the metallic platen cover.

As described above, since the electromagnetic wave shielding member 5a is provided for the platen cover 5, it is possible to effectively shield high-frequency electromagnetic fields generated from internal apparatus. This is because an eddy current flows in the shielding member 5a due to the magnetic flux generated from the inside of the apparatus in such a direction that the magnetic flux generated by the eddy current cancels the magnetic flux passing through the shielding member 5a in accordance with Lenz's law.

Figure 4A:
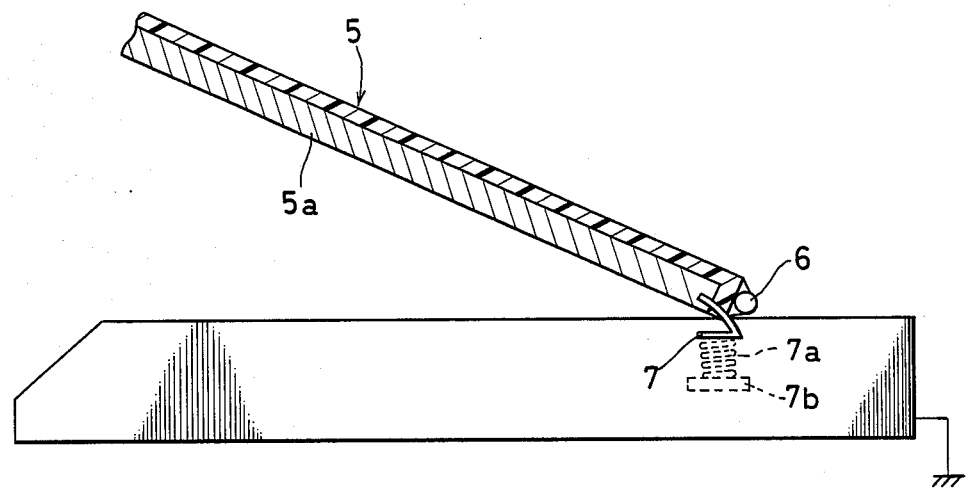
FIG. 4A is an enlarged side view showing a first method of grounding the shielding member according to the present invention.
Figure 4B:
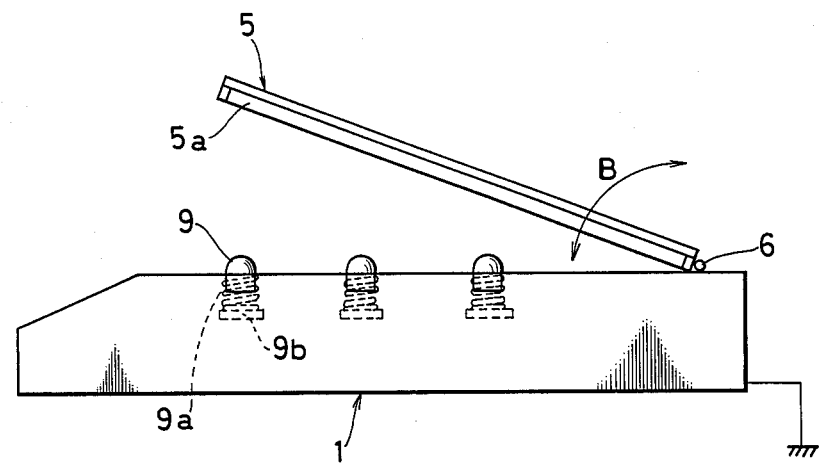
FIG. 4B is a side view showing a second method of grounding the shielding member according to the present invention.

FIGS. 4A and 4B show methods of grounding the shielding member through the apparatus body 2 to further increase the shielding effect thereof.

In FIG. 4A, a roughly L-shaped conductive spring 7 is attached to the shielding member 5a at one end thereof.

This spring plate 7 is connected to the machine body 2 (shown in FIG. 1) via a conical spring 7a and a spring support projection 7b formed in the machine body 2. Therefore, the shielding member 5a is connected to the ground via the machine body 2 to further increase the shielding effect. In addition, the conical spring 7a serves to open/close the platen cover 5 in snap-action manner in cooperation with the hinge 6. Since the spring plate 7 is connected to the machine body 2 via a coil spring 7a, the platen cover 5 can be closed tightly against the original mounting base 3 without producing any gap between the platen cover 5 and the base 3. However, without being limited to the above, the coil spring can be an elastic member of another shape, and the spring plate 7 can be a wire when no snap action is required in closing the platen cover 5.

In FIG. 4B, some connector pins 9 are arranged, in place of the L-shaped conductive spring plate 7, so as to be connectable with the shielding member 5a whenever the platen cover 5 is closed against the original mounting base 3. The connector pins 9 are cylindrical in shape and made of a conductive material such as an iron, copper, etc. A coil spring 9a connected to a spring support projection 9b of the machine body 2 urges each connector pin 9 in the upward direction. When the platen cover 5 is closed, the connector pins 9 are all pushed down by the platen cover 5 while keeping an electrical contact between the shielding member 5a and the connector pins 9.

When an operator uses an image reading apparatus, an original is set onto the original mounting base 3; and the platen cover 5 is closed against the original to support and protect the original from external light. Under these conditions, since the original mounting base 3 is perfectly shielded by the platen cover 5, it is possible to prevent electromagnetic fields generated from the apparatus from leaking outside, so that it is possible to prevent harmful influences of electromagnetic fields upon other apparatus installed in the vicinity of an image reading apparatus according to the present invention.

Figure 5A:
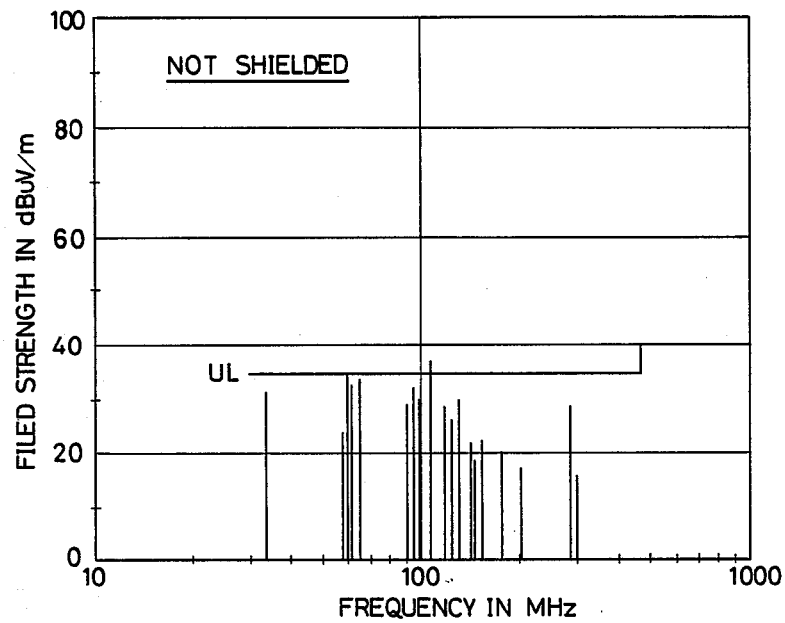
FIG. 5A is a graphical representation showing a radiation test result obtained before the shielding member of the present invention is attached to the image reading apparatus.
Figure 5B:
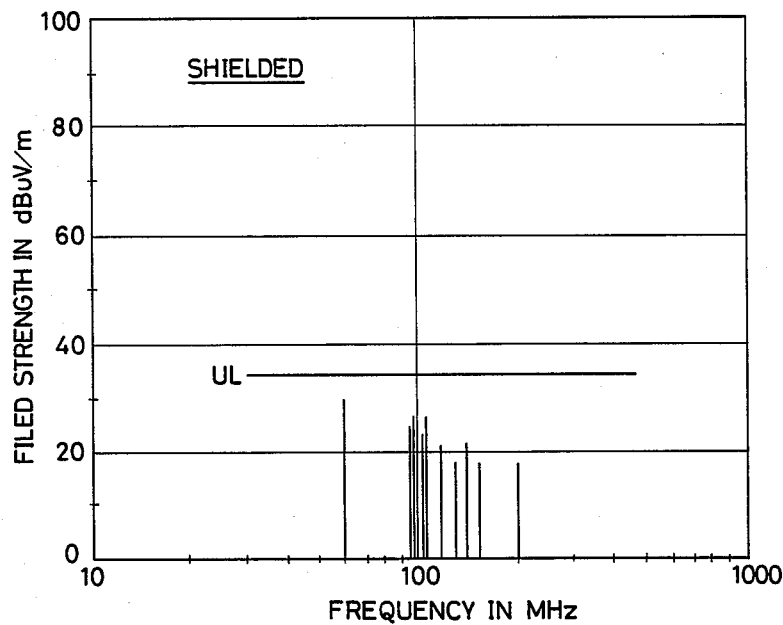
FIG. 5B is a similar graphical representation showing a radiation test result obtained after the shielding member of the present invention has been attached to the image reading apparatus.

FIGS. 5A and 5B show electromagnetic wave radiation test results measured by a spectrum analyzer. FIG. 5A indicates the relationship between the field strength (dB uV/m) and the frequency components (MHz) obtained when a vertical antenna was disposed 10 meters away from the image reading apparatus provided with no shielding member, while FIG. 5B indicates the same relationship obtained when the same apparatus provided with the shielding member according to the present invention was measured under the same measurement conditions.

In comparison between FIGS. 5A and 5B, it is clearly understood that the effect of the shielding member is noticeable such that the field strength can be reduced roughly by 5 dB or more near 100 MHz. Further UL denotes an upper limit prescribed by a certain standard.

To clear the upper limit of this standard as shown, the graphs indicate that the shielding member is indispensable.

What is claimed is:

1. An image reading apparatus, comprising:
   an apparatus body having an original mounting portion; and
   original holding means for holding an original placed on the original mounting portion including a platen cover pivotably mounted on top of the apparatus body, and shielding means for shielding an internal electromagnetic field generated from within the apparatus and leaked through the original mounting portion;
   wherein said electromagnetic field shielding means is connected to said apparatus body via connecting means; and
   wherein said connecting means includes at least one roughly L-shaped spring plate having a first end fixed to the platen cover and a second end elastically connected to the apparatus body via a conical spring disposed near a pivotal axis of the platen cover.

2. An image reading apparatus, comprising:
   an apparatus body having an original mounting portion; and
   original holding means for holding an original placed on the original mounting portion including a platen cover pivotably mounted on top of the apparatus body, and shielding means for shielding an internal electromagnetic field generated from within the apparatus and leaked through the original mounting portion;
   wherein said shielding means is connected to said apparatus body via connecting means; and
   wherein said connecting means includes at least one cylindrical conductive member having a first end connectable to said shielding means and a second end connected to the apparatus body via a conical spring disposed at a periphery of the original mounting portion.

3. An image reading apparatus, comprising:
   an apparatus body having an original mounting portion; and
   original holding means for holding an original placed on the original mounting portion;
   wherein said original holding means includes a platen cover pivotably mounted on top of the apparatus body, and metallic shielding means for shielding an internal electromagnetic field generated from within the apparatus and leaked through the original mounting portion;
   wherein said electromagnetic field shielding means is connected to said apparatus body via connecting means; and
   wherein said platen cover has a pivotal axis and wherein said connecting means includes at least one substantially L-shaped spring plate having a first end fixed to the platen cover and a second end elastically connected to the apparatus body via a conical spring disposed proximate the pivotal axis of the platen cover.

4. An image reading apparatus, comprising:
   an apparatus body having an original mounting portion; and
   original holding means for holding an original placed on the original mounting portion;
   wherein said original holding means includes a platen cover pivotably mounted on top of the apparatus body, and metallic shielding means for shielding an internal electromagnetic field generated from within the apparatus and leaked through the original mounting portion;
   wherein said shielding means is connected to said apparatus body via connecting means; and
   wherein said connecting means includes at least one cylindrical conductive member having a first end connectable to said shielding means and a second end connected to the apparatus body via a conical spring disposed at a periphery of the original mounting portion.

5. An image reading apparatus, comprising:
   (a) an apparatus body having an original mounting portion;
   (b) original holding means, having a platen cover pivotably mounted on top of said apparatus body, for holding an original placed on the original mounting portion; and
   (c) shielding means for shielding an internal electromagnetic field generated from within the apparatus and leaked through the original mounting portion, said shielding means being connected to said apparatus body via connecting means including at least a spring having a first end fixed to the platen cover and a second end elastically connected to the apparatus body.

6. The apparatus of claim 5, wherein said spring includes a roughly L-shaped spring plate having a first end fixed to the platen cover and a second end elastically connected to the apparatus body via a conical spring disposed near a pivotal axis of the platen cover.

7. The apparatus of claim 5, wherein said shielding means includes a conductive sheet attached to the platen cover made of a resin.

8. The apparatus of claim 5, wherein said shielding means includes a conductive paint applied onto the platen cover.

9. The apparatus of claim 5, wherein said shielding means includes a cloth coated by a conductive paint.

10. The apparatus of claim 5, wherein said platen cover includes a conductive material to shield external light and the internal electromagnetic field simultaneously.

11. The apparatus of claim 5, wherein said shielding means includes a metallic member for shielding an internal electromagnetic field generated from within the apparatus and leaked through the original mounting portion.

12. An image reading apparatus, comprising:
    (a) an apparatus body having an original mounting portion;
    (b) original holding means, having a platen cover pivotably mounted on top of said apparatus body, for holding an original placed on the original mounting portion; and
    (c) shielding means for shielding an internal electromagnetic field generated from within the apparatus and leaked through the original mounting portion, said shielding means being connected to said apparatus body via connecting means including at least one cylindrical conductive member having a first end connectable to said shielding means and a second end connected to the apparatus body via a spring disposed at a periphery of the original mounting portion.

13. The apparatus of claim 12, wherein said connecting means includes a roughly L-shaped spring plate having a first end fixed to the platen cover and a second end elastically connected to the apparatus body via a conical spring disposed near a pivotal axis of the platen cover.

14. The apparatus of claim 12, wherein said shielding means includes a conductive sheet attached to the platen cover made of resin.

15. The apparatus of claim 12, wherein said shielding means includes a conductive paint applied onto the platen cover.

16. The apparatus of claim 12, wherein said shielding means includes a cloth coated by a conductive paint.

17. The apparatus of claim 12, wherein said platen cover includes a conductive material to shield external light and the internal electromagnetic field simultaneously.

18. The apparatus of claim 12, wherein said shielding means includes a metallic member for shielding an internal electromagnetic field generated from within the apparatus and leaked through the original mounting portion.

19. An image reading apparatus, comprising:
   (a) an apparatus body having an original mounting portion;
   (b) original holding means, having a platen cover pivotably mounted on top of said apparatus body, for holding an original placed on the original mounting portion; and
   (c) metallic shielding means for shielding an internal electromagnetic field generated from within the apparatus and leaked through the original mounting portion, said metallic shielding means being connected to said apparatus body via connecting means including at least one roughly L-shaped spring plate having a first end fixed to the platen cover and a second end elastically connected to the apparatus body via a conical spring disposed near a pivotal axis of the platen cover.

* * * * *